US012184007B2

(12) United States Patent
Dobler

(10) Patent No.: US 12,184,007 B2
(45) Date of Patent: Dec. 31, 2024

(54) ELECTRIC PLUG CONNECTOR

(71) Applicant: Neutrik AG, Schaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 337 days.

(21) Appl. No.: 17/763,115

(22) PCT Filed: Sep. 21, 2020

(86) PCT No.: PCT/EP2020/025424
§ 371 (c)(1),
(2) Date: Mar. 23, 2022

(87) PCT Pub. No.: WO2021/058127
PCT Pub. Date: Apr. 1, 2021

(65) Prior Publication Data

US 2022/0344865 A1 Oct. 27, 2022

(30) Foreign Application Priority Data

Sep. 24, 2019 (AT) ................................ A50815/2019

(51) Int. Cl.
*H01R 13/516* (2006.01)
*H01R 13/40* (2006.01)
(Continued)

(52) U.S. Cl.
CPC ......... *H01R 13/5219* (2013.01); *H01R 13/40* (2013.01); *H01R 13/516* (2013.01); *H01R 13/6271* (2013.01); *H01R 13/74* (2013.01)

(58) Field of Classification Search
None
See application file for complete search history.

(56) References Cited

U.S. PATENT DOCUMENTS 6,241,554 B1 * 6/2001 Murakami ......... H01R 13/5205 439/587
6,257,928 B1 * 7/2001 Murakami ......... H01R 13/5213 439/587
(Continued)

FOREIGN PATENT DOCUMENTS

CN 204516967 U 7/2015
CN 204615057 U 9/2015
(Continued)

OTHER PUBLICATIONS

International Search Report and Written Opinion for International Patent Application No. PCT/EP2020/025424 issued on Apr. 1, 2021.

*Primary Examiner* — Tho D Ta
(74) *Attorney, Agent, or Firm* — Volpe Koenig

(57) ABSTRACT

The disclosure relates to an electrical plug connector, with a housing with at least one insertion opening for a complementary plug connector and a contact carrier, arranged in the housing, for the electrical contacts accessible through the insertion opening(s). Two concentrically arranged housing parts are connected to one another via a base on the end opposite the at least one insertion opening. Between the housing parts, an annular intermediate space is formed as an annular receiving opening for the plug extension of a complementary plug connector. A receiving space for the contact carrier is provided inside the internal housing part.

18 Claims, 7 Drawing Sheets

(51) Int. Cl.

| | |
|---|---|
| ***H01R 13/52*** | (2006.01) |
| ***H01R 13/627*** | (2006.01) |
| ***H01R 13/74*** | (2006.01) |

(56) References Cited

U.S. PATENT DOCUMENTS

| | | | | |
|---|---|---|---|---|
| 7,507,125 | B2 * | 3/2009 | Okamura | H01R 13/506 439/903 |
| 8,465,311 | B2 | 6/2013 | Takamatsu | |
| 9,837,755 | B2 * | 12/2017 | Hsu | H01R 13/5219 |
| 10,090,622 | B2 | 10/2018 | Ludwig et al. | |
| 10,396,490 | B2 * | 8/2019 | Okamura | H01R 13/5841 |
| 11,043,773 | B2 | 6/2021 | Ambo | |
| 2009/0305542 | A1 * | 12/2009 | Masuzaki | G02B 6/3891 439/271 |
| 2020/0083633 | A1 | 3/2020 | Maesoba et al. | |

FOREIGN PATENT DOCUMENTS

| | | | |
|---|---|---|---|
| CN | 201498774 | U | 6/2016 |
| CN | 207009841 | U | 2/2018 |
| CN | 109273904 | A | 1/2019 |
| EP | 2431777 | A1 | 3/2012 |
| EP | 3252876 | A1 | 12/2017 |
| EP | 3382818 | B1 | 5/2020 |
| EP | 3748784 | A1 | 9/2020 |
| JP | 2018152215 | | 9/2018 |
| WO | 2019139797 | A1 | 7/2019 |

* cited by examiner

ELECTRIC PLUG CONNECTOR

CROSS-REFERENCE TO RELATED APPLICATIONS

This application is a U.S. National phase based on, and claiming priority to, PCT/EP2020/025424, filed on Sep. 21, 2020 entitled "ELECTRIC PLUG CONNECTOR," which is based on and claims priority to Austrian Patent Application No. A50815/2019, filed on Sep. 24, 2019, each of which are hereby incorporated by reference in their entirety.

BACKGROUND

The disclosure relates to an electrical plug connector.

Electrical plug connectors, whether they are built-in plug connector, also referred to as chassis sockets, or cable plug connectors, typically consist of a housing with at least one insertion opening for a complementary plug connector, and a contact carrier, arranged in said housing, for the electrical contacts accessible through the insertion opening(s).

The mechanical as well as electrical requirements are very different for housings and contact carriers, which has resulted in that there are countless combinations of housing variants and variants of contact carriers, which only match in very specific combinations. Even for plug connectors of the same standard but with a different number of contacts or a different contact arrangement, in most cases, completely different housings must be used, which causes a high expense in production and storage of the components.

EP 3382818 A1 discloses a sealed feed-through of a standard interface through a wall, wherein the sealing housing consisting of multiple parts, surrounding this standard interface functional on its own is arranged on both sides of the wall. In one of the parts of the sealing housing, an annular, flat groove open towards the wall is formed for accommodating a washer.

An electrical plug with a coding function is the subject matter of EP 3252876 A1. The stationary part of the plug connection has a housing with a (square) annular insertion opening for the coding element of the mating plug, which could be interpreted as an annular extension of the mating plug. Inside the housing, the electrical contacts are held in a structure, the design of which is not disclosed or comprehensible. According to an interpretation of the drawings, it is a single-piece section of the housing of the plug.

EP 2431777 A1 describes a plug arrangement, in which, in the housing of a built-in plug socket, an annular insertion opening is designed for a plug-in extension of a mating plug. The contact is held in the central part of the housing, which functions as a contact carrier.

CN 204615057 U discloses a plug connector, in which a contact carrier is inserted into a housing as a separate component, wherein on the insertion side, between the inner wall of the housing and the outer surface of the contact carrier, an annular intermediate space is formed as an intermediate space for the annular extension of a mating plug connector. The contact carrier contains the electrical contacts and is fixed by a rear cover in the housing having only one wall, which contact carrier can be connected to the housing by means of a latching connection. On the insertion side, a projecting mounting flange is arranged on the housing.

An object of the present disclosure was to overcome the shortcomings of the prior art and to provide a device, by means of which the structure of an electrical plug connector can be simplified, and each component can be optimally constructed according to its requirements.

This object may be achieved by a device according to the claims.

An object of the present disclosure was to overcome the shortcomings of the prior art and to provide a device representing an optimally sealed plug connector with easy handling and a simple and quick mounting with only few components.

This object may be achieved by means of a device and a method according to the claims.

The device according to the disclosure is fundamentally characterized by a receiving opening for the contact carrier formed inside the internal housing part at the level of overlap of the concentric housing parts, which receiving opening is formed by the cylindrical volume inside the internal housing part, and in that the contact carrier extends into the longitudinal section of the inner housing part abutting on its inner side, which overlaps with the outer housing part. Thus, the housing, which is mostly responsible for the mechanical stability, which is also particularly significant for establishing and releasing the plug connection in a simple manner, can be designed optimally for this purpose.

This also includes the choice of materials. The contact carrier, however, may be geared completely to the electrical requirements and achieve the fixing of the electrical contacts and their electrically insulating arrangement in the housing alone. As the design of the housing is independent of the electrical requirements of the contact carrier, it can always have the same design, particularly with regard to the dimensions inside the inner housing part of the housing and can thus be provided as a standard component suitable for many types of plugs.

Guide structures may be formed between the inner wall of the inner housing part and the contact carrier. This facilitates the assembly of the housing and the contact carrier and ensures the correct positioning of the contact carrier in the housing.

An advantageous embodiment of the disclosure provides that a connecting mechanism between the contact carrier and the housing is provided, in order to securely maintain the positioning of the connecting mechanism during plugging-in and unplugging operations.

This can be realized in a simple and functionally reliable manner in that the connecting mechanism may be constructed as a latching and/or snap connection.

The positioning of the contact carrier in the housing being the same for all identically designed plug connectors is ensured according to a further optional feature of the disclosure in that advantageously, at least one stop for the contact carrier is provided.

A preferred embodiment of a plug connector according to the disclosure provides its construction as a built-in plug connector or chassis socket and is characterized by a mounting flange radially projecting from the outer housing part, which mounting flange is preferably positioned on the insertion-side end of the outer housing part.

A seal is present in this design, which covers a front side of the mounting flange and has at least one through hole corresponding to the insertion opening.

According to a further optional feature, a front plate, which covers the front side of the mounting flange and possibly also the seal towards the front serves the protection of the underlying components and the stability of the entire arrangement.

According to a further embodiment of the disclosure, the plug connector is characterized by a locking mechanism for an inserted complementary plug connector, comprising at least one locking element, which is arranged on the contact carrier.

However, an unlocking element may also be present in this embodiment, which protrudes from the locking element through recesses in the housing and possibly the front plate on the front side of the housing and/or the front plate.

In this regard, an integrally formed dome is advantageously arranged on the seal in the embodiments with a seal and a front plate for maintaining the sealing effect well, which dome serves to accommodate the unlocking element and protrudes forwards. The dome protrudes through the front plate on its front side.

An advantageous embodiment provides a plug connector with a contact carrier designed for XLR contacts.

A different advantageous embodiment provides a plug connector with a contact carrier designed for the contacts for data plugs, in particular RJ45 plugs.

BRIEF DESCRIPTION OF THE DRAWINGS

For the purpose of better understanding of the disclosure, it will be elucidated in more detail by means of the figures below.

These show in a respectively very simplified schematic representation.

DETAILED DESCRIPTION

Figure 1:
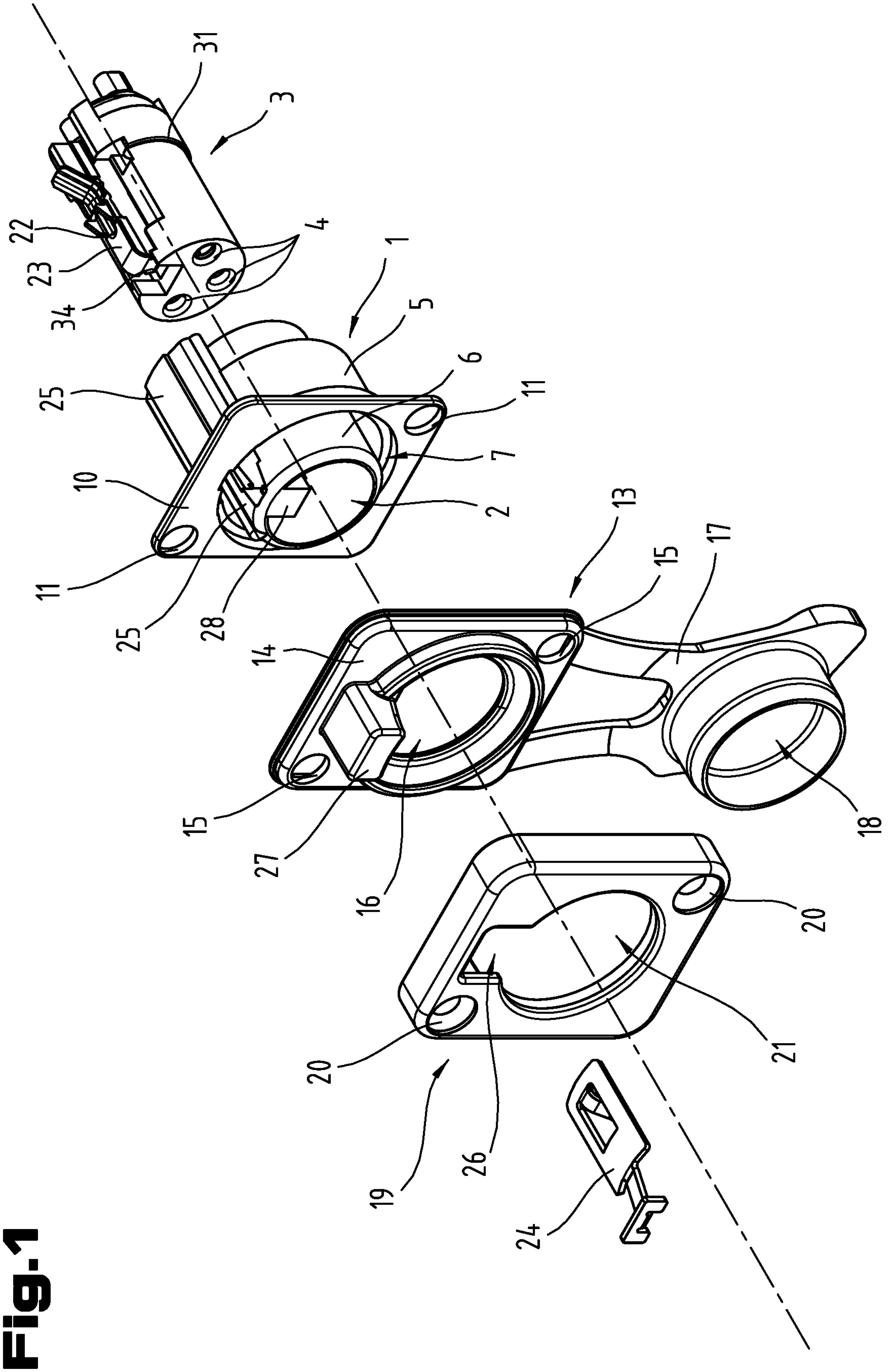
FIG. 1 an exploded view of a first embodiment of a built-in plug connector according to the disclosure.
Figure 4:
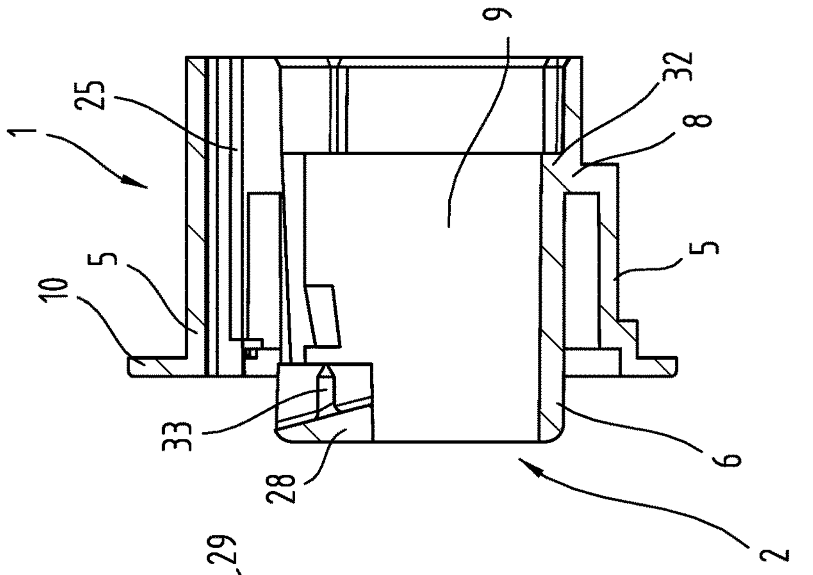
FIG. 4 a longitudinal section through the housing of the built-in plug connector of FIG. 1 in the vertical central plane, FIG. 5 a longitudinal section according to FIG. 4 through a built-in plug connector of FIG. 1.
Figure 3:
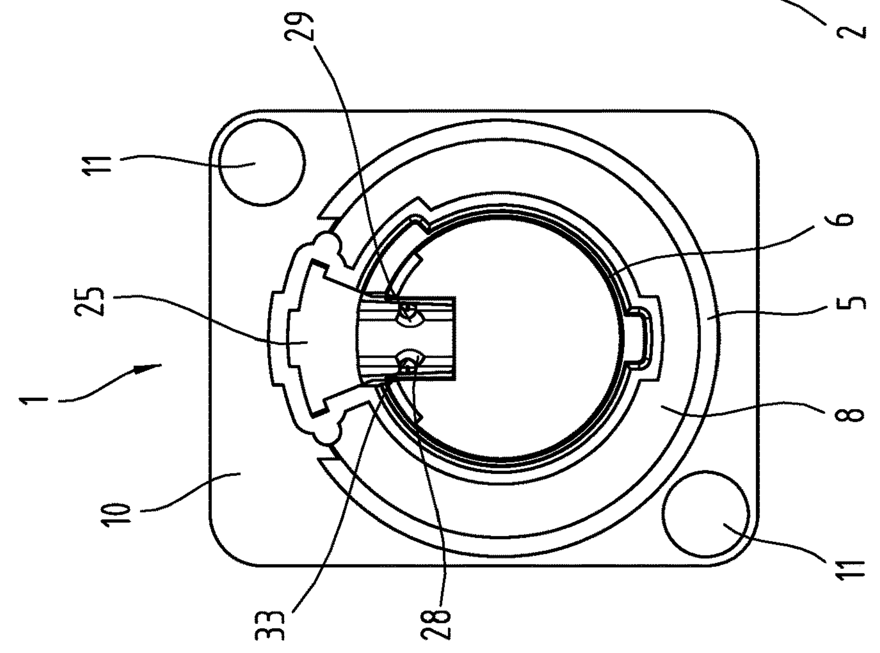
FIG. 3 a rear view of the housing of the built-in plug connector of FIG. 1.
Figure 2:
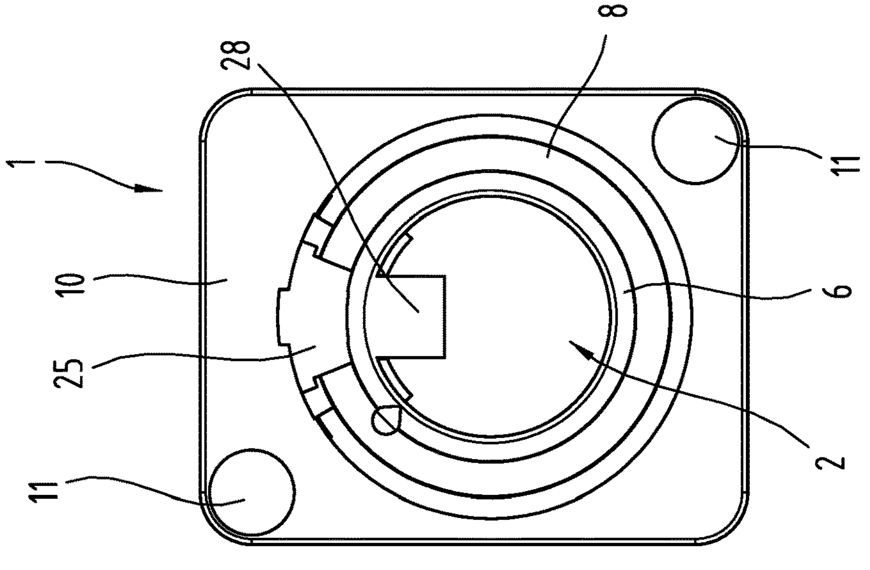
FIG. 2 a front view of the housing of the built-in plug of FIG. 1.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIGS. 1 to 5 show a first advantageous embodiment of the built-in plug connector according to the disclosure, in a variant of the XLR standard with three contacts, as a female part of the plug connection and/or as a built-in socket.

The built-in socket of FIGS. 1 to 5 as an example for an electrical plug connector according to the disclosure has a housing 1 with at least one insertion opening 2 for a complementary plug connector. In this housing 1, a contact carrier 3 for the electrical contacts accessible through its contact insertion opening(s) 4 is present. The contact carrier 3 is designed for plug connections according to the XLR standard, in this example shown having three contacts. The housing 1 is made up of two concentrically arranged housing parts, an outer housing part 5 and an inner housing part 6, which are spaced from one another by an annular gap 7, wherein said annular gap 7 forms an annular insertion opening for a plug projection, in the form of a socket, of a complementary cable connector. An annular bottom 8 connects the two housing parts 5, 6 at the end of the housing 1 located opposite the insertion opening 2. The cylindrical volume inside the internal housing part 6 forms the receiving space 9 for the contact carrier 3.

Here, a mounting flange 10 shown having a square outline is shown by way of example on the front end of the housing 1, which mounting flange 10 projects radially from the housing 1, in particular from the outer housing part 5, and in which also mounting bores 11 may be recessed. Other contours may also occur, for example circular or rectangular contours. Only one or multiple small mounting lugs may also possibly be arranged on an otherwise sole cylindrical housing 1.

The front side of the housing 1 and/or the mounting flange 10 may advantageously be covered by a seal 13, which seals the built-in plug connector against the wall, in which the socket is installed and fixed. Preferably, the seal 13 has a plate-shaped part 14, which overlaps the mounting flange 10, also with a through hole 15 at the location of the mounting bores 11 and a central cutout 16 for feeding through the complementary cable plug connector. Preferably, flexible strips 17 start from the plate-shaped part 14, at the ends of which strips 17 for example pot-shaped sealing plug 18 is provided, for insertion into the through hole 16 and preferably also the annular gap 7 between the inner housing part 6 and outer housing part 5, in order to be able to tightly close the built-in plug connector when the complementary plate-shaped part is not plugged in.

For fixing the seal and for a better mechanical stability of the entire arrangement, preferably, a front plate 19 is present, which covers the front side of the mounting flange 10 and possibly also the seal 13, in particular its plate-shaped section 14, towards the front. This front plate 19, as well, has its own mounting bores 20 at the locations of the mounting bores 11 of the mounting flange 10, possibly also the through holes 15 of the seal 13. A cutout hole as an insertion opening 21 is also present.

The plug connector according to the disclosure also has a locking mechanism 22 for an inserted complementary plug connector, in order to prevent inadvertent unplugging of the cable plug connector and thus a release of the plug connection. This mechanism 22 comprises at least one locking element 23, which may be arranged on the contact carrier 3. For deliberately unlocking and allowing the unplugging of the cable plug connector, an unlocking element 24 in operative connection to the locking element 23 is integrated into the locking mechanism 22. The unlocking element 24 protrudes, starting from the locking element 23, through recesses and/or protuberances 25 in the housing 1 and a radial recess 26 in the central cutout 21 of the front plate 19 on the front side of the housing 1 and/or the front plate 19, from where it is accessible for the user to actuate.

In order to not compromise the sealing effect in doing so, the section of the unlocking element 24 protruding through the front plate 19 is covered by a dome 27 integrally formed onto the seal 13, in particular to the plate-shaped section 14, for accommodating the unlocking element 24, which dome 27 protrudes forward and preferably protrudes through the front plate 19 beyond its front side.

Figure 5:
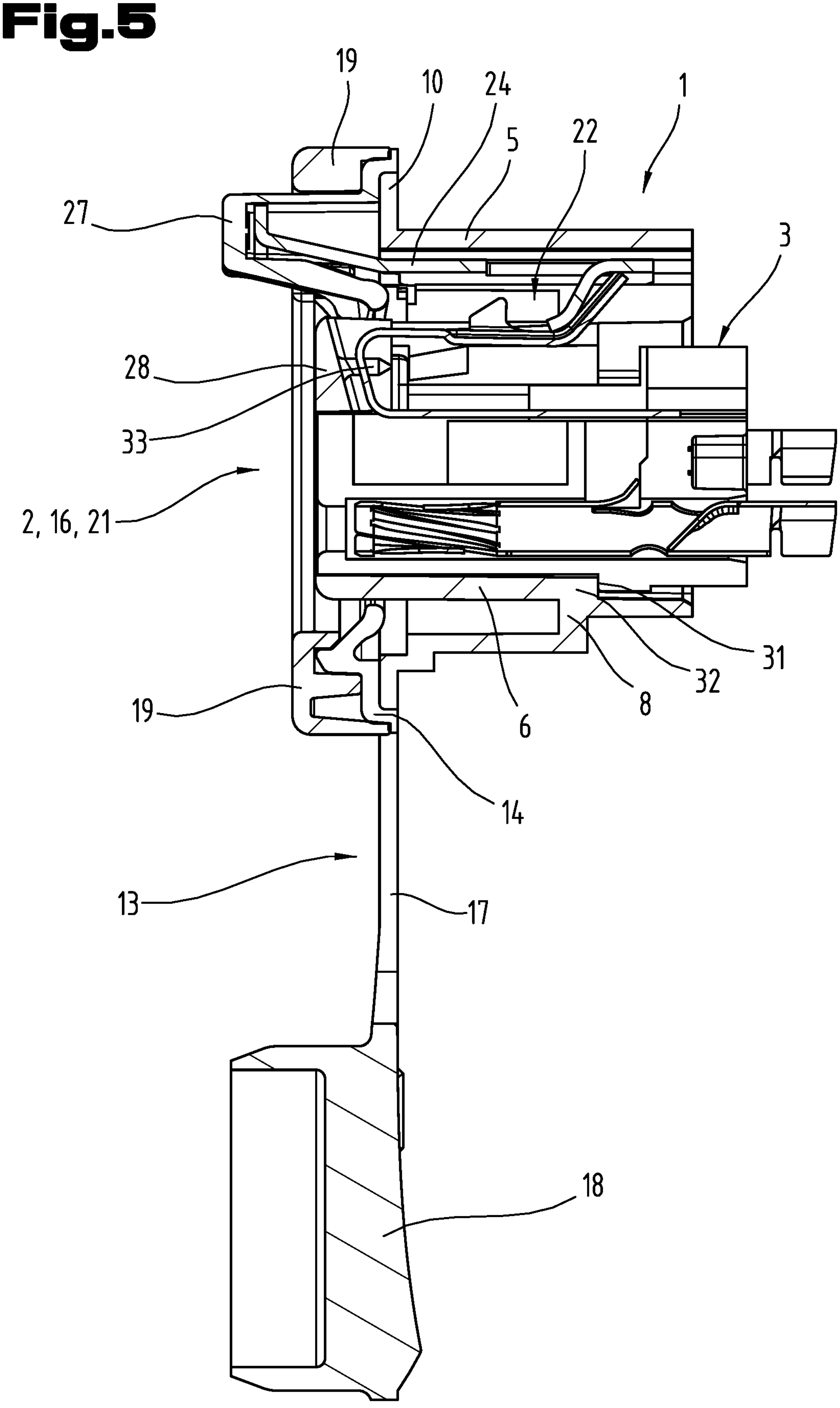
Figure 6:
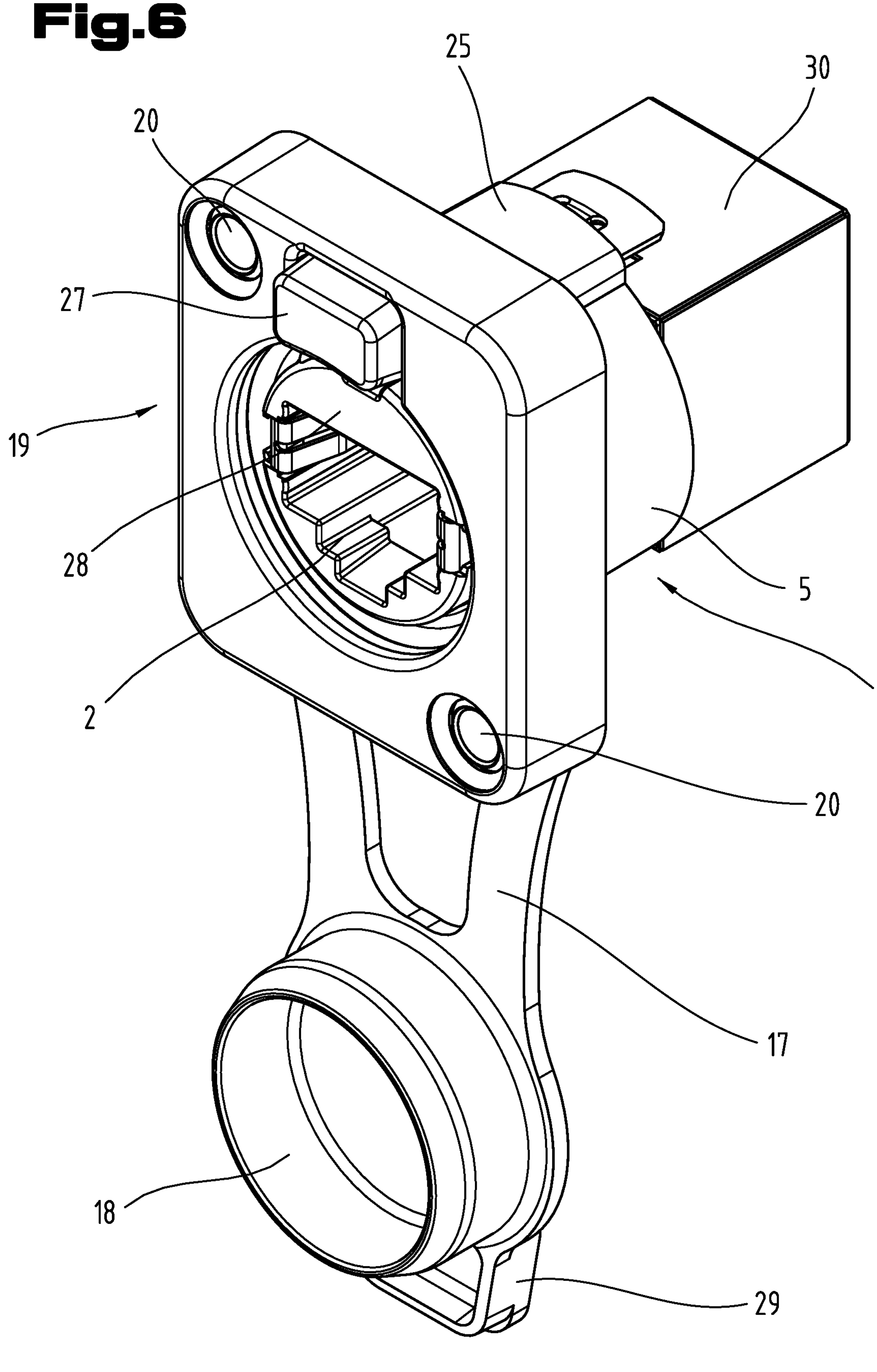
FIG. 6 a perspective view of a further embodiment of a built-in plug connector according to the disclosure.
Figure 7:
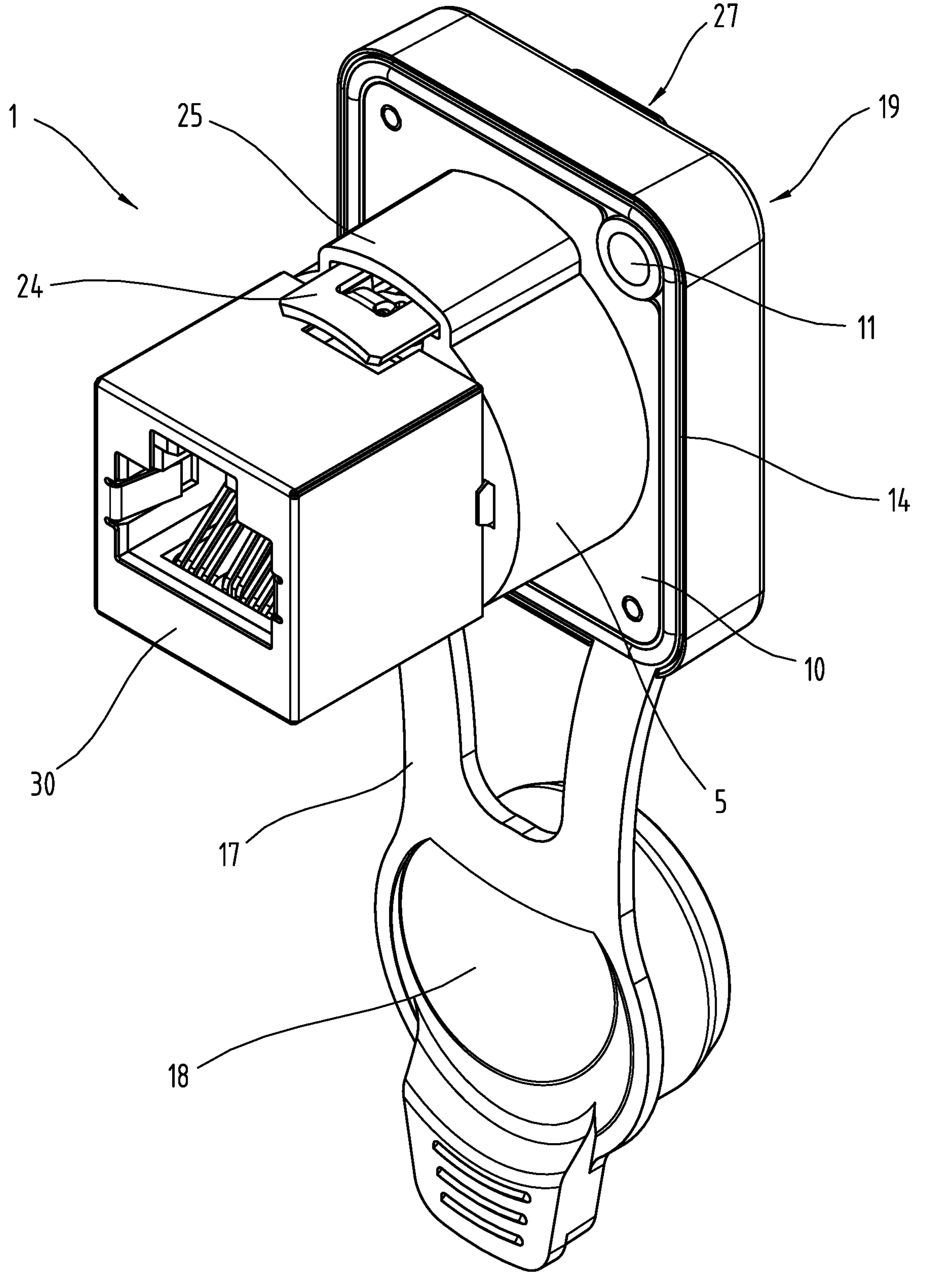
FIG. 7 a perspective rear view of the built-in plug connector of FIG. 6.
Figure 8:
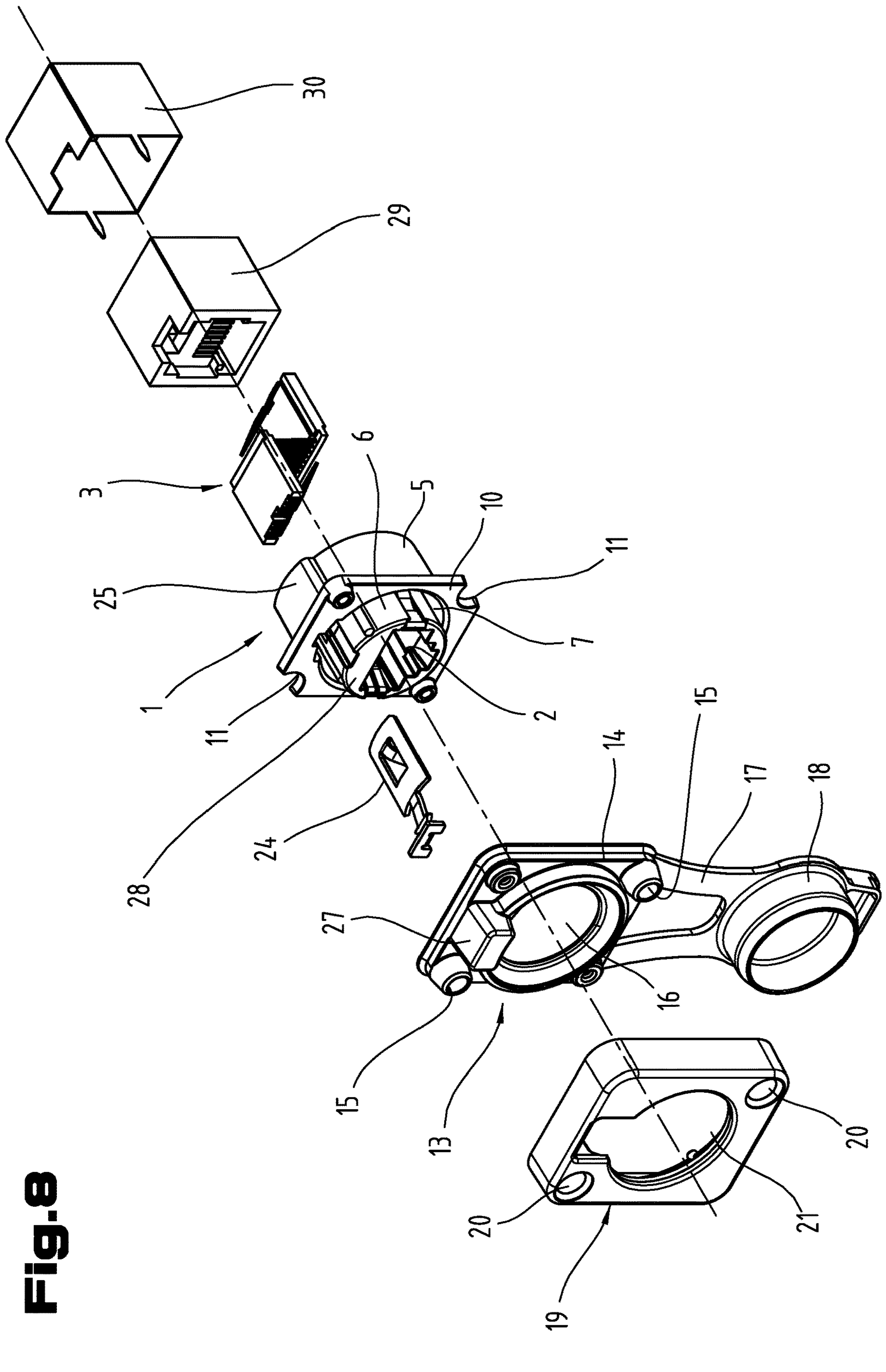
FIG. 8 an exploded view of the built-in plug connector of FIG. 6.
Figure 9:
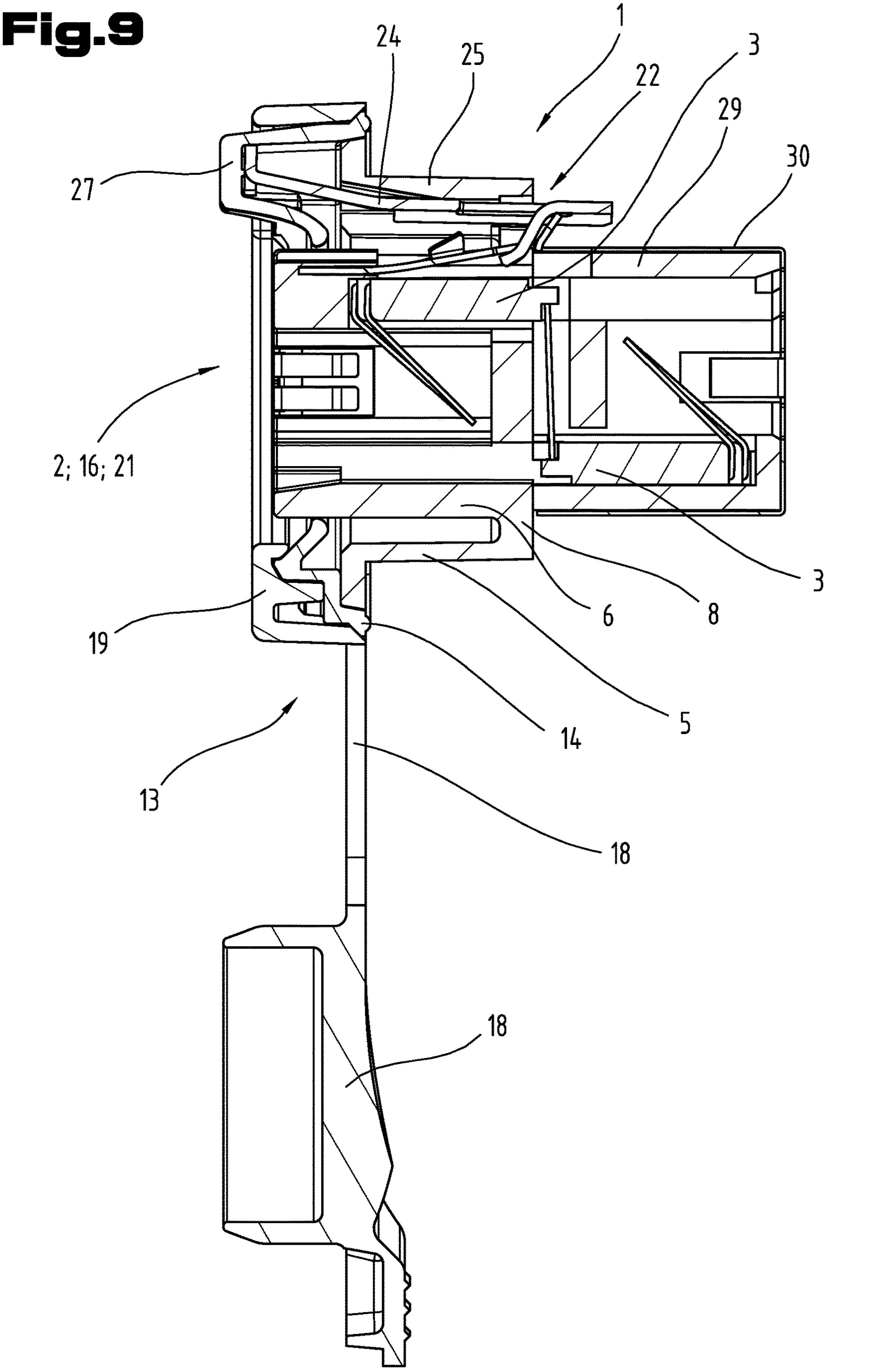
FIG. 9 a longitudinal section through the built-in plug connector of FIG. 6 in the vertical central plane.

As can be seen in FIGS. 1 and 5, the contact carrier 3 is preferably designed as an insertion part, and guide structures are possibly formed between the inner wall of the inner housing part 6 and the contact carrier 3. A connecting mechanism may be in effect between the contact carrier 3 and the housing 1, in order to securely hold the contact carrier 3 in the housing 1. This may take place, if need be, by means of crimping the rear edge of the housing 1 radially inwards over an outer circumferential edge of the inserted contact carrier 3. Another alternative consists in that the connecting mechanism is designed as a latching and/or snap connection.

The contact carrier 3 has a shoulder 31, which extends over a large part of the circumference and is formed by an increase in diameter between the insertion-side longitudinal section and the section connecting thereto. In a complementary manner, a shoulder 32 is formed on the inner side of the housing 1, approximately at the level of the base 8, which connects the inner housing part 6 to the outer housing part 5. At this shoulder 32, the shoulder 31 of the contact carrier 3 comes to a stop upon insertion into the housing 1, whereby the desired positioning of the two components relative to one another is ensured.

The recess 34 on the front side, existing in particularly XLR contact carriers 3, to which the region of the bearing for the locking mechanism 22 connects, is covered by a catch 28 protruding towards the center of the insertion opening 2. This catch 28 may advantageously have two guides 29 extending in parallel with the longitudinal axis of the housing 1, between which guides 29 particularly the spring of the locking mechanism 22 is guided and held.

FIGS. 6 to 9 show a further and possibly independent embodiment of a built-in plug connector according to the disclosure, wherein again, equal reference numbers and/or component designations are used for equal parts as in FIGS. 1 to 5 above. In order to avoid unnecessary repetitions, it is pointed to/reference is made to the detailed description of the preceding figures. FIGS. 6 to 9 show a built-in socket for a data plug, in particular a RJ-45 plug.

The contact carrier 3 of this version of the built-in plug socket according to the disclosure is covered and protected on the rear side of the housing 1 by a contact feed-through 29 and a rear covering 30.

The exemplary embodiments show possible embodiment variants, and it should be noted in this respect that the disclosure is not restricted to these particular illustrated embodiment variants of it, but that rather also various combinations of the individual embodiment variants are possible and that this possibility of variation owing to the technical teaching provided by the present disclosure lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

List of reference numbers

| | | |
|---|---|---|
| 1 | Housing | 36 |
| 2 | Insertion opening | 37 |
| 3 | Contact carrier | 38 |
| 4 | Insertion openings | 39 |
| 5 | Outer housing part | 40 |
| 6 | Inner housing part | 41 |
| 7 | Annular gap | 42 |
| 8 | Base | 43 |
| 9 | Receiving space | 44 |
| 10 | Mounting flange | 45 |
| 11 | Mounting bores | 46 |
| 12 | | 47 |
| 13 | Seal | 48 |
| 14 | Plate-shaped section | 49 |
| 15 | Through hole | 50 |
| 16 | Central cutout | 51 |
| 17 | Strip | 52 |
| 18 | Sealing plug | 53 |
| 19 | Front plate | 54 |
| 20 | Mounting bore | 55 |
| 21 | Central cutout | 56 |
| 22 | Locking mechanism | 57 |
| 23 | Locking elements | 58 |
| 24 | Unlocking element | 59 |
| 25 | Protuberance/Recess | 60 |
| 26 | Radial recess | 61 |
| 27 | Dome | 62 |
| 28 | Catch | 63 |
| 29 | Contact feed-through | 64 |
| 30 | Covering | 65 |
| 31 | Shoulder | |
| 32 | Shoulder | |
| 33 | Guide | |
| 34 | Recess | |
| 35 | | |

The invention claimed is:

1. An electrical plug connector, comprising a housing with at least one insertion opening for a complementary plug connector and a contact carrier inserted into the housing and designed as an insertion part, for the electrical contacts accessible through an insertion opening, wherein the housing has two housing parts that are arranged concentrically and overlap one another in a longitudinal direction, wherein a base connects the housing parts on an end opposite of at least one insertion opening, and wherein an annular intermediate space between the housing parts forms an annular receiving opening for a plug extension of a complementary plug connector, wherein a receiving space for the contact carrier is formed inside an inner housing part at a level of overlap of the housing parts and formed by a cylindrical volume inside the inner housing part, and the contact carrier extends into a longitudinal section of the inner housing part abutting on an inner side, which overlaps with an outer housing part, further comprising a mounting flange projecting radially from the outer housing part, the mounting flange is positioned on an insertion-side end of the outer housing part.

2. The plug connector as claimed in claim 1, wherein guide structures are formed between an inner wall of the inner housing part and the contact carrier.

3. The plug connector as claimed in claim 1, wherein at least one stop is provided for the contact carrier on the inner side of the housing.

4. The plug connector as claimed in claim 1, wherein the contact carrier is configured for XLR contacts.

5. The plug connector as claimed in claim 1, wherein the contact carrier is configured for contacts for data plugs, in particular RJ45 plugs.

6. The plug connector as claimed in claim 1, further comprising a connecting mechanism located between the contact carrier and the housing.

7. The plug connector as claimed in claim 6, wherein the connecting mechanism is configured as a latching and/or snap connection.

8. The plug connector as claimed in claim 1, wherein a seal covers a front side of the mounting flange and has at least one through hole corresponding to the insertion opening.

9. The plug connector as claimed in claim 8, wherein a front plate covers the front side of the mounting flange and the seal.

10. An electrical plug connector, comprising a housing with at least one insertion opening for a complementary plug connector and a contact carrier inserted into the housing and designed as an insertion part, for the electrical contacts accessible through an insertion opening, wherein the housing has two housing parts that are arranged concentrically and overlap one another in a longitudinal direction, wherein a base connects the housing parts on an end opposite of at least one insertion opening, and wherein an annular intermediate space between the housing parts forms an annular receiving opening for a plug extension of a complementary plug connector, wherein a receiving space for the contact carrier is formed inside an inner housing part at a level of overlap of the housing parts and formed by a cylindrical volume inside the inner housing part, and the contact carrier extends into a longitudinal section of the inner housing part abutting on an inner side, which overlaps with an outer housing part, further comprising a locking mechanism for a complementary plug connector, wherein at least one locking element is arranged on the contact carrier, wherein an unlocking element protrudes from the locking element through recesses in the housing and a front plate on a front side of the housing and/or the front plate.

11. The plug connector as claimed in claim 10, further comprising a seal with an integrally formed dome for accommodating the unlocking element, the dome protrudes forwards and protrudes through the front plate beyond its front side.

12. An electrical plug connector, comprising:

a housing with at least one insertion opening for a complementary plug connector and a contact carrier inserted into the housing and designed as an insertion part, the housing has two housing parts that are arranged concentrically and overlap one another in a longitudinal direction;

a base connecting the housing parts on an end opposite of at least one insertion opening;

an annular intermediate space between the housing parts form an annular receiving opening for a plug extension of a complementary plug connector;

a receiving space for the contact carrier is formed inside an inner housing part at a level of overlap of the housing parts and formed by a cylindrical volume inside the inner housing part; and the contact carrier extends into a longitudinal section of the inner housing part abutting on an inner side, which overlaps with an outer housing part, further comprising a mounting flange projecting radially from the outer housing part, the mounting flange is positioned on an insertion-side end of the outer housing part.

13. The plug connector as claimed in claim 12, wherein a stop is provided on an inner side of the housing.

14. The plug connector as claimed in claim 12, further comprising a seal with an integrally formed dome.

15. The plug connector as claimed in claim 12, further comprising a locking element.

16. The plug connector as claimed in claim 12, further comprising a connecting mechanism located between the contact carrier and the housing.

17. The plug connector as claimed in claim 16, wherein the connecting mechanism is a latch or snap configuration.

18. An electrical plug connector, comprising:

a housing with at least one insertion opening for a complementary plug connector and a contact carrier inserted into the housing and designed as an insertion part, the housing has two housing parts that are arranged concentrically and overlap one another in a longitudinal direction;

a base connecting the housing parts;

an annular intermediate space between the housing parts form an annular receiving opening;

a receiving space for the contact carrier formed on inside an inner housing part; and the contact carrier extending into a longitudinal section of the inner housing part abutting on an inner side, further comprising a mounting flange projecting radially from an outer housing part, the mounting flange is positioned on an insertion-side end of the outer housing part.

* * * * *